(12) United States Patent
Fahmie (10) Patent No.: US 10,974,133 B2
(45) Date of Patent: *Apr. 13, 2021

(54) PROGRAMMABLE HAND-HELD VIDEO GAMING CONTROLLER WITH INTEGRATED FOOT-PEDAL CONTROLLER PLATFORM

(71) Applicant: John E Fahmie, Lecanto, FL (US)

(72) Inventor: John E Fahmie, Lecanto, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,253

(22) Filed: Nov. 29, 2019

(65) Prior Publication Data

US 2020/0384353 A1 Dec. 10, 2020

Related U.S. Application Data

(63) Continuation-in-part of application No. 16/433,177, filed on Jun. 6, 2019, now Pat. No. 10,543,424.

(51) Int. Cl.
*A63F 13/23* (2014.01)
*A63F 13/22* (2014.01)
*A63F 13/245* (2014.01)
*A63F 13/803* (2014.01)

(52) U.S. Cl.
CPC .............. *A63F 13/23* (2014.09); *A63F 13/22* (2014.09); *A63F 13/245* (2014.09); *A63F 13/803* (2014.09); *A63F 2300/1018* (2013.01); *A63F 2300/1025* (2013.01); *A63F 2300/1043* (2013.01)

(58) Field of Classification Search
None
See application file for complete search history.

(56) References Cited

U.S. PATENT DOCUMENTS

| | | | | |
|---|---|---|---|---|
| 5,860,861 | A * | 1/1999 | Lipps | A63F 13/06 463/36 |
| 6,422,941 | B1* | 7/2002 | Thorner | A63F 13/02 463/30 |
| 2004/0176166 | A1* | 9/2004 | Siegel | A63F 13/06 463/37 |
| 2006/0258458 | A1* | 11/2006 | Addington | A63F 13/22 463/36 |
| 2006/0287089 | A1* | 12/2006 | Addington | A63F 13/21 463/37 |
| 2008/0214305 | A1* | 9/2008 | Addington | A63F 13/235 463/36 |
| 2010/0001948 | A1* | 1/2010 | Logue | G06F 3/023 345/156 |

(Continued)

*Primary Examiner* — Tramar Harper (57) ABSTRACT

A gaming platform including a programmable hand-held video gaming controller in electrical communication with an integrated foot-pedal gaming controller. The programmable hand-held video gaming controller including, at least one game function activation area, each of the at least one game function activation areas operating a game function, each of the at least one game function activation areas further including a function control transfer switch. The integrated foot-pedal gaming controller platform including at least one foot pedal configured to control at least one game function when a corresponding function control transfer switch on the programmable hand-held video gaining controller is activated.

8 Claims, 6 Drawing Sheets

(56) References Cited

U.S. PATENT DOCUMENTS

| | | | | |
|---|---|---|---|---|
| 2010/0048357 | A1* | 2/2010 | Nakagawa | G06F 3/0312 |
| | | | | 482/8 |
| 2014/0378226 | A1* | 12/2014 | Gaug | A63F 13/245 |
| | | | | 463/36 |
| 2015/0029047 | A1* | 1/2015 | Levasseur | A63F 13/214 |
| | | | | 341/21 |
| 2018/0088684 | A1* | 3/2018 | Dillon | G06F 3/0383 |

* cited by examiner

PROGRAMMABLE HAND-HELD VIDEO GAMING CONTROLLER WITH INTEGRATED FOOT-PEDAL CONTROLLER PLATFORM

This application claims priority to application Ser. No. 16/433,177:

FIELD

The present disclosure relates to hand-held video gaming controllers, and more specifically, to a mechanism for utilizing foot-pedals along with or in lieu of the traditional hand-operations in a video gaming controller in order to simplify the hand commands, improve a gamer's performance, and increase the overall level of enjoyment and realistic experience for the user.

BACKGROUND

Currently "traditional" hand-held video gaming controllers can have more than a "dozen" buttons and "two" joysticks to operate all the commands needed with most video games, of which generally "ten" buttons and both "joysticks" are operated with just your thumbs, limiting a players ability to just "two" commands at the same time on these buttons and/or joysticks.

The "traditional" layout on most video gaming controllers "group" many of the buttons close to each other; which can result in pressing the wrong button, especially when under pressure. The ability to separate the functions of these "grouped" buttons could reduce pressing the wrong button by mistake.

By integrating a platform that couples different "traditional hand held gaming controller" functions to a separate apparatus, would allow a player to operate "traditional hand-held controller" commands such as examples: gas, brake, clutch while operating automobiles; rudders and flaps when operating aircraft, or even track controls on tanks and other machines, with the use of their feet, providing a more realistic experience and potentially "doubling" the number of traditionally "thumb-operated" commands that could be made at the same time, giving a player a clear advantage over their opponent.

SUMMARY

The present disclosure is a method and system for utilizing foot-pedals along with the traditional hand-operations in a video gaming controller such that player can assign different "traditional" hand-held video gaming controller functions to one or more foot-pedals on an integrated foot-pedal gaming controller platform. The number of foot pedals that can be used in lieu of traditional hand controls can depend, for example, on the level of expertise of the player. For example, a novice player may choose to activate "one" pedal while an advanced player can choose a plurality of pedals.

In one embodiment of the present disclosure, a gaming platform is provided. The gaming platform includes a programmable hand-held video gaming controller including at least one game function activation area, each of the at least one game function activation areas operating a game function, each of the at least one game function activation areas further comprising a function control transfer switch, and an in electrical communication with the programmable hand-held video gaming controller. The integrated foot-pedal gaming controller platform includes at least one foot pedal configured to control at least ogre game function when a corresponding function control transfer switch on the programmable hand-held video earning controller is activated.

In another embodiment of the present disclosure, a gaming method for sharing or transferring gaming function control between a programmable hand-held video gaming controller and an integrated foot-pedal gaming controller platform is provided. The method includes activating a function control transfer switch located on a game function activation area of the programmable hand-held video gaming controller, the activation of the function control transfer switch transferring control of the gaming function associated with the game function activation area to a corresponding foot pedal on the integrated foot-pedal gaming controller platform.

In another embodiment, a gaming platform is provided, the gaming platform including a programmable hand-held video gaining controller including at least one game function activation area, each of the at least one game function activation areas operating a game function. Each of the at least one game function activation areas further including a function control transfer switch operable to transfer control of the game function to different foot pedals on an integrated foot pedal gaming controller platform upon successive activations of the function control transfer switch, and at least one indicator light configured to indicate which pedal on the integrated foot pedal gaming controller platform control of the game function associated with the game function activation area has been transferred to. The gaming platform further includes an integrated foot-pedal gaming controller platform in electrical communication with the programmable hand-held video gaming controller, the integrated foot-pedal gaming controller platform including at least one foot pedal configured to control at least one game function when a corresponding function control transfer switch on the programmable hand-held video gaming controller is activated.

In another embodiment, a gaming platform is provided, the gaming platform including a programmable hand-held video gaming controller including at least one game function activation area, each of the at least one game function activation areas operating a game function. Each of the at least one game function activation areas further including a function control transfer switch configured to the transfer control of the game function to either a left gaining shoe or a right gaming shoe as part of an integrated gaming shoe controller platform. The gaming platform further includes an integrated gaming shoe controller platform in electrical communication with the programmable hand-held video gaining controller, the integrated gaming shoe platform including at least one function activation pad configured to control at least one game function when a corresponding function control transfer switch on the programmable hand-held video gaming controller is activated.

In another embodiment, a gaming platform is provided, the gaming platform including a programmable hand-held video gaming controller including at least one game function activation area, each of the at least one game function activation areas operating a game function. Each of the at least one game function activation areas further including a function control transfer switch configured to transfer control of the game function to a control mechanism incorporated into the programmable hand-held video gaming controller that would allow a user to activate game function by rotating the programmable hand-held video gaming controller to the left or to the right.

DETAILED DESCRIPTION

Figure 1:
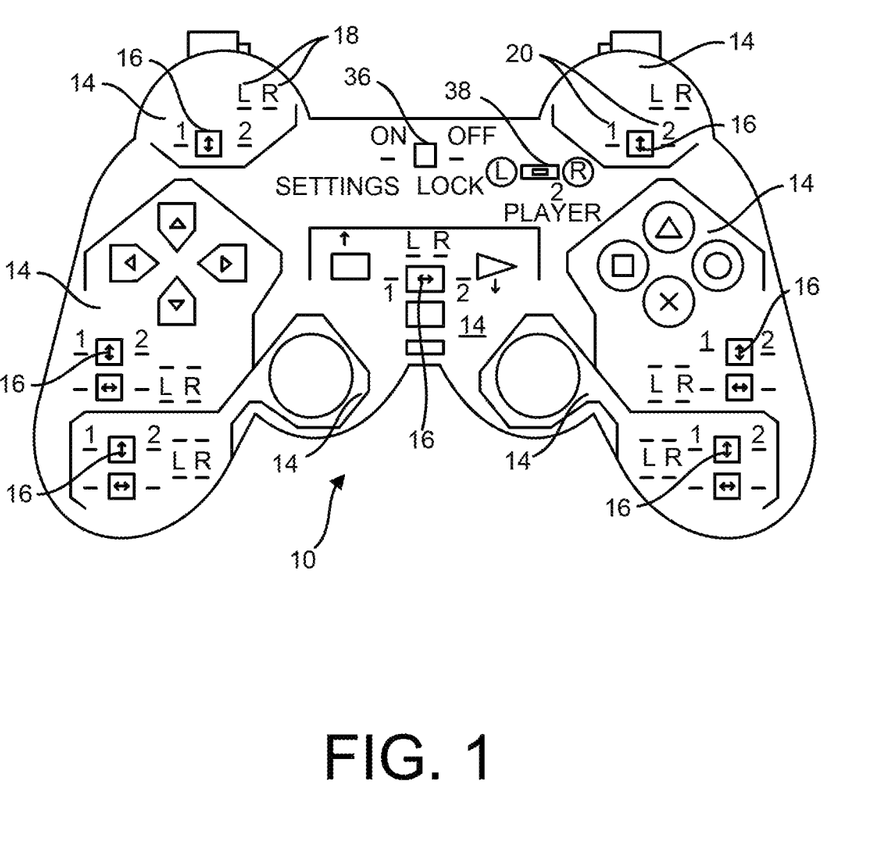
FIG. 1 illustrates a top view of the programmable hand-held video gaming controller of the present disclosure.

FIG. 1 illustrates an exemplary layout of the programmable hand-held video gaming controller 10 of the present disclosure. Game controller 10 is electrically coupled to an integrated foot pedal gaming controller platform 12 (see FIG. 2) either via wires or wirelessly, through communication methods commonly known in the electrical arts. Both the game controller 10 and integrated foot pedal gaming controller platform 12 are fully operable to provide control to various gaming features as commonly known in the art. Both game controller 10 and integrated foot pedal gaming controller platform 12 include the necessary hardware, software, memory, and electrical circuits to provide a fully-programmable video game controller module as is currently known in the art.

Game controller 10 includes one or more game function activation areas 14, each of which includes game control buttons, switches, levers, etc., commonly known in the art to allow a user to control specific game functions. Each game function activation areas 14 also includes a game function transfer switch 16 that is configured to perform a variety of functions. The present disclosure is not limited to the exact type of gaming functions that can be performed by the activation of switch 16. Further, switch 16 can be a push button, or any other type of switch commonly known in the art.

Game controller 10 may, in certain embodiments, also include indicator lights 18 and 20. Indicator lights 18 and 20 are located in each game function activation area 14. Indicator lights 18 indicate which side of integrated foot pedal gaming controller platform 12 control for that specific game function has been transferred to. For example, if control of the function associated with a particular game function activation areas 14 is transferred to the left side of integrated foot pedal gaming controller platform 12 then indicator light 18 will show an "L" and if the control of the game function has been transferred to the right side of the integrated foot pedal gaming controller platform 12 then indicator light 18 will show an "R".

Similarly, indicator lights 20 indicate which pedal of integrated foot pedal gaming controller platform 12 control for that specific game function has been transferred to. For example, if control of the function associated with a particular game function activation areas 14 is transferred to the first pedal of integrated foot pedal gaming controller platform 12 then indicator light 20 will show a "1" and if the control of the game function has been transferred to the second pedal of the integrated foot pedal gaming controller platform 12 then indicator light 20 will show an "2". Thus, for example, if control of a particular game function has been transferred to the second pedal of the right side of integrated foot pedal gaming controller platform 12 indicator light 18 will show an "R" and indicator light 20 will show a "2," In this fashion, the user can easily see which pedals are not controlling this particular game function.

Figure 2:
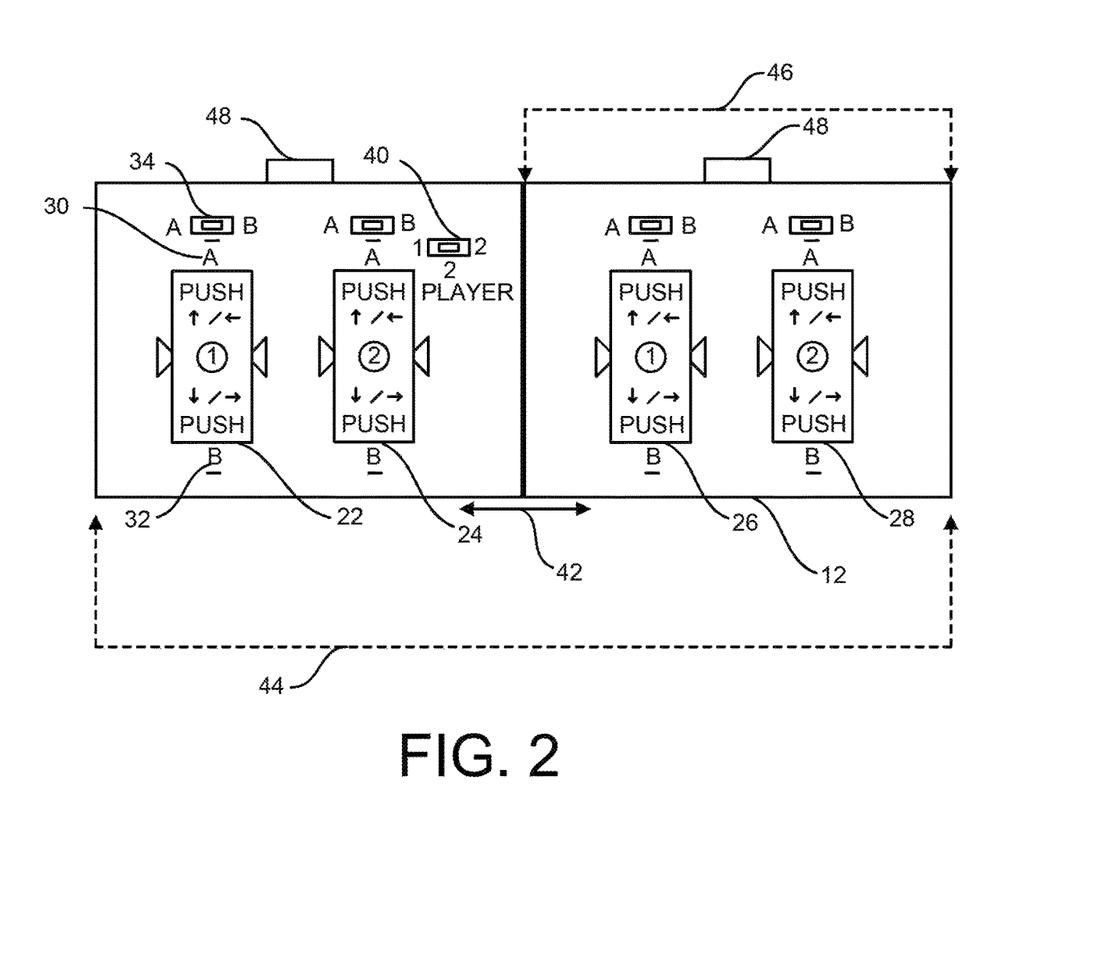
FIG. 2 illustrates a top view of the integrated foot-pedal gaming controller platform of the present disclosure.

An exemplary methodology of how game function controls are transferred to foot pedals will now be discussed. Referring now to both FIG. 1 and FIG. 2, in one embodiment, when switch 16 located in a game function activation area 14 is activated for a first time, instead of the selected game function associated with the game controls in the function activation area 14 remaining, in the control of game controller 10 as is traditional, the selected game function is transferred to a corresponding foot pedal on integrated foot pedal gaming controller platform 12. For example, when switch 16 is activated a first time, the gaming function that would normally be initiated by the activation of switch 16 is instead transferred to a corresponding pedal located on foot pedal gaming controller platform 12, e.g., the first pedal 22 on the left side of the integrated foot pedal gaming controller platform 12, as shown in FIG. 2. This allows the user to control this particular game function by activating the corresponding foot pedal, i.e., pedal 22 on integrated foot pedal gaming controller platform 12, rather than controlling the game function via use of game controller 10. As described above, in one embodiment, corresponding indicator lights 18 and 20 on gaming controller 10 may be illuminated to thus indicate that control of this particular game function has been transferred from game controller 10 to a corresponding foot pedal on integrated foot pedal gaming controller platform 12, for instance, the first pedal 22 on the left side of integrated foot pedal gaming controller platform 12, as shown in FIG. 2. In another embodiment, indicator lights 18 and 20 on integrated foot pedal gaming controller platform 4 are also illuminated to indicate to the user which foot pedal is currently controlling a game function.

In other embodiments, when switch 16 on game controller 10 is activated a second time, the game function that would normally be controlled by switch 16 is transferred to a different foot pedal, i.e., different from the foot pedal that controls the game function when switch 16 is activated for a first time. For example, when switch 16 is activated a second time, the function that would normally be activated by the actuation of switch 16 on game controller 10 is transferred to a different foot pedal on integrated foot pedal gaming controller platform 12. For example, this foot pedal, could be the second pedal 24 on the left side of the integrated foot-pedal gaming controller platform 12, as shown in FIG. 2. Again, in one embodiment, corresponding indicator lights 18 and 20 on game controller 10 and indicator lights on integrated foot pedal gaining controller platform 12 may be illuminated to indicate that control of this particular game function has been transferred to a corresponding foot pedal on integrated foot pedal gaming controller platform 12, for instance second pedal 24 on the left side of integrated foot pedal gaming controller platform 12.

In another embodiment, when switch 16 is activated a third time, the function that would normally be associated with switch 16 on game controller 10 is transferred to a different foot pedal on integrated foot pedal gaming controller platform 12, i.e., different from the foot pedal to which control of the game function was transferred when switch 16 was activated a first time and the foot pedal to which control of the game function was transferred when switch 16 was activated a second time. For example, this foot pedal could be the first pedal 26 on the right side of integrated foot pedal gaming controller platform 12. In one embodiment, corresponding indicator lights 18 and 20 on game controller 10 and indicator lights on integrated foot pedal gaming controller platform 12 may be illuminated to indicate that this particular game function has been transferred to a corresponding pedal on integrated foot pedal gaming controller platform 12, for instance, the first pedal 26 on the right side of integrated foot pedal gaming controller platform 12.

In another embodiment, when switch 16 is activated a fourth time, the function that would normally be activated by the activation of switch 16 on game controller 10 is transferred to a different foot pedal on integrated foot pedal gaining controller platform 12, i.e., different from the foot pedal to which control of the game function was transferred when switch 16 was activated a first time, the foot pedal to which control of the game function was transferred when switch 16 was activated a second time, and the foot pedal to which control of the game function was transferred when switch 16 was activated a third time. For example, this foot pedal to which control is transferred could be the second pedal 28 on the right side of integrated foot pedal gaming controller platform 12. In one embodiment, corresponding indicator lights 18 and 20 on both game controller 10 and indicator lights on integrated foot pedal gaming controller platform 12 may be illuminated to indicate that this particular game function has been coupled to a corresponding pedal on integrated foot pedal gaming controller platform 12, in this instance, the second pedal 28 on the right side of integrated foot pedal gaming controller platform 12.

In still another embodiment, when switch 16 on game controller 10 is activated a fifth time, all connections to integrated foot pedal gaming controller platform 12 are deactivated along with corresponding indicator lights 18 and 20 on game controller 10 and integrated foot pedal gaming controller platform 12, returning control of the function back to the hand-held game controller 10.

Note that the number and order of activations of the switch 16 given above to transfer control of a game function from game controller 10 to a specific pedal on integrated foot pedal gaming controller platform 12 is exemplary only. Thus, the present disclosure is not limited to the exact number of switch 16 activations or the order of switch 16 activations indicated above. Thus, for example, a first activation of switch 16 may transfer control to, for example, the first pedal 26 on the right side of integrated foot pedal, gaming controller platform 12. Further, activating switch 16 may result in different operations. For example, in one embodiment, if switch 16 is activated for a first time, instead of the game function remaining in the control of game controller 10, the selected function is coupled to a foot pedal on the integrated foot pedal gaining control platform 14. If switch 16 is, pressed two times, control of that, gaining function is moved to a different pedal on the integrated foot pedal gaming platform 14. However, if switch 16 is activated three times, the connection of the indicated function to the pedals of the integrated foot pedal gaming controller platform 14 and push button and indicators is deactivated, returning control of the function solely to hand-held game controller 10.

The term "transferring" as used herein may mean that total control of a game function is transferred from game controller 10 to integrated foot pedal gaming controller platform 12 and control of that game function in the hand-held game controller 10 is deactivated, or it may mean that control of this game function is shared between both hand-held game controller 10 and integrated foot pedal gaming controller platform 12. This latter embodiment may be advantageous for example "in the heat of battle" during gaining when garners may wish to use both the hand held game controller 10 and foot pedals on the integrated foot pedal gaming controller platform 12 without having to think about which apparatus is currently controlling the game function.

Referring again to FIG. 1, when, for example, the first pedal 22 on the left side of integrated foot pedal gaming controller platform 12 is being used for certain game function control, the switch 16 associated with the selected function and the corresponding indicator light 18 will illuminate to show an "L" and indicator light 20 will illuminate to show a "1" on the programmable hand-held video gaming controller, Further, in another embodiment, a corresponding upright pedal function indicator light "A" 30 or an inverter pedal function indicator light "B" 32, will illuminate on the corresponding pedal (i.e., 22) on integrated foot pedal gaming controller platform 12, depending on which setting the pedal function inverter switch 34 is set to. This, advantageously, alerts players as to which setting the pedal function inverter switch 34 is set to, either upright function or inverted function. This feature allows the gamer to access two different gaming functions per foot pedal.

An exemplary use of the pedal function inverter switch 34 is, in one embodiment, each time a player activates game function transfer switch 16 on programmable hand-held video gaming controller 10, it transfers two functions to a rocker pedal, one at the top of the pedal and one at the bottom of the pedal. With pedal function inverter switch 34, the player can choose to reverse those two functions if they wish. For example, if the player transferred the gas and brake functions of an automobile-based video game to a rocker pedal and the brake function was at the top of the pedal and the gas function was at the bottom of the pedal, a player may choose to reverse these two functions so the gas function is at the top of the rocker pedal and the brake function is at the bottom of the pedal. This would allow any control function on gaming controller 10 to be transferred to (or coupled to) the top or the bottom of any rocker pedal, thereby doubling a player's options.

When, for example, the second pedal 24 on the left side of the integrated foot pedal gaming controller platform 12 is being used for certain game function control, the push button for the selected function will be illuminated and the corresponding indicator 18 will illuminate with an "L" and corresponding indicator 20 will illuminate with a "2" on the programmable hand-held video gaming controller. Also, the corresponding "A" 30 or "B" 32 indicator lights for pedal 24 (indicated as "2" on the hand-held game controller because it is the second foot pedal) will illuminate on the integrated foot pedal gaming controller platform 12, alerting a player to which setting the pedal function inverter switch 34 is set to, i.e., either upright function or inverted function. Thus, for example, when control of a game function has been given to the second pedal 28 on the right side of the integrated foot, pedal gaming controller platform 12, the push button for the selected function in the game function activation area illuminates and the corresponding indicator 18 will show an "R" and indicator 20 will show a "2". In one embodiment, function inverter switch 34 indicator light "A" 30 or "B" 32 will be also illuminated on the integrated foot pedal gaming platform 12. In this fashion, the indicator lights fully alert the gamer as to which pedals have taken over, or are sharing control, each game function.

In one embodiment, hand-held game controller 10 may include an on/off push button switch 36 that activates and deactivates a setting lock on all programmable hand-held video gaming controller functions and illuminates corresponding on/off indicator lights. In one embodiment, on/off push button switch 36 requires players to hold the switch 36 for a predetermined amount of time, e.g., two seconds, to switch on or off the function and to prevent unwanted changes to the settings.

In one embodiment, game controller 10 includes a two player selector switch 38 that allows two players, each equipped with a programmable hand-held video gaming controller 10, to choose either left side pedals (either the first pedal and/or the second pedal on the left side) or right side pedals (either the first pedal and/or the second pedal on the right side) on the integrated foot-pedal gaming controller platform 12. The use of the player selector switches 38 thus limits the programmable hand-held video gaming controller functions to either the selected left side pedals "1" and "2" or right side pedals "1" and "2" of the integrated foot pedal gaming controller platform 12 thereby allowing two players to play side-by-side with the use of two pedals each.

As discussed herein, in certain embodiments, the programmable hand-held video gaming controller 10 may transfer the activated function to the integrated foot pedal controller platform 12 or instead of transferring game function control to the foot pedals, control can be shared between game controller 10 and the foot pedals of integrated foot pedal controller platform 12.

Referring to FIG. 2, in one embodiment, one or more of the pedals of integrated foot-pedal gaming controller platform 12 may be dual operation rocker pedals that allow a player to rock the pedal forward or backwards to perform two separate programmable hand-held video gaming controller functions with one pedal. Pedal function inverter switch 34 allows a player to reverse pedal function from upright pedal function to inverted pedal function. Pedal function indicator light "A" 30 indicates the upright foot, pedal function while pedal function indicator light "B" 32 indicates the inverted foot pedal function. Two-player indicator light 18 on programmable hand-held video gaming controller 10 will illuminate an "L" when a player chooses to use the left side pedals '1" 22 and "2" 24 on the integrated foot pedal gaming platform 12. Two-player indicator light 18 will illuminate "R" when a player chooses to use the right side pedals "1" 26 and "2" 28 on the integrated foot pedal gaming controller platform 12. In one embodiment, when a player chooses the two-player indicator light "L" or the two player indicator light "R" setting on the programmable hand-held video gaming controller 10 it will also activate and illuminate the two-player switch 40 on the integrated foot pedal gaming controller platform 12, thus alerting the player that the two-player switch has been activated on the programmable hand-held video gaming controller 10.

In other embodiments, variations of the integrated foot pedal gaming controller platform 12 may include single function pedals, dual operation rocker pedals, quad-operation (4-way) rocker pedals or combinations of two or more. The 4-way rocker pedal can be rocked forward or backward or side to side to allow a player to activate four different functions with a single pedal like a typical joystick. Other variations of the integrated foot pedal gaining controller platform 12 may be modified to fit, into a gaming chair, in place of an adjustable hinged connecting frame that forms the integrated foot pedal gaming controller platform 12.

Figure 4:
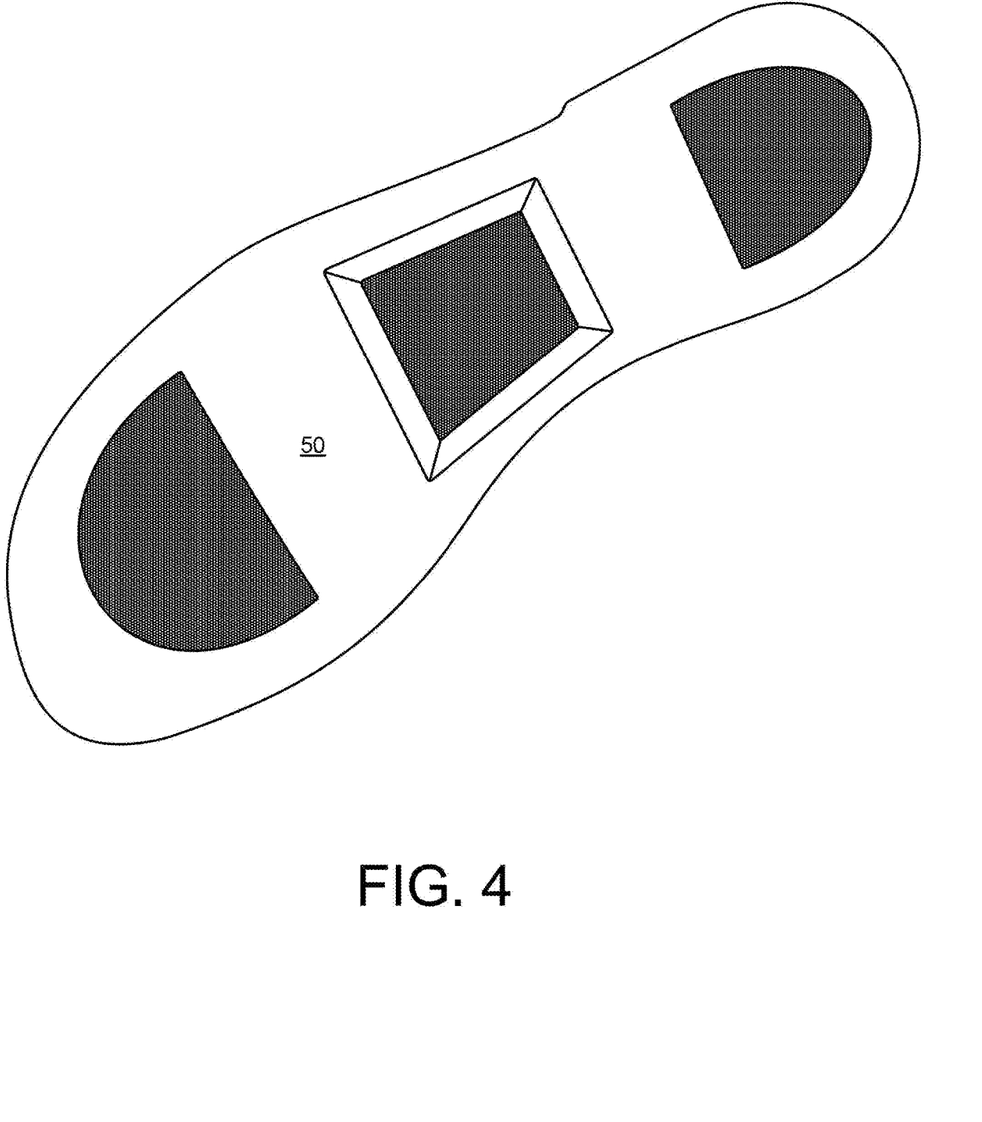
FIG. 4 illustrates the bottom view of the dual function gaming shoe of the present disclosure.
Figure 5:
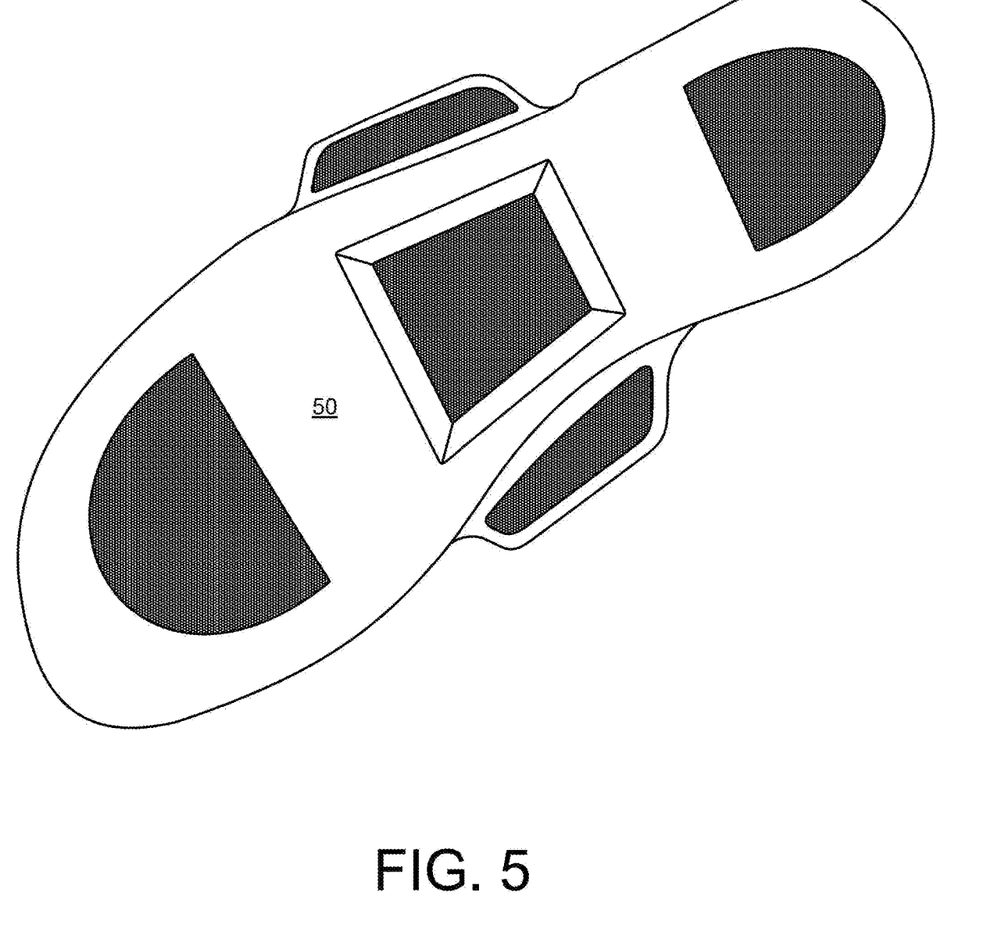
FIG. 5 illustrates the bottom view of the quad function gaming shoe of the present disclosure.

In another embodiment, variations of the integrated foot pedal gaming controller platform 12, may be incorporated into footwear. For example, in one embodiment; rather than having rocker pedals mounted on a deck platform, a "dual-function" rocker pedal mechanism may be incorporated in the construction of a gaming shoe 50, as shown in FIG. 4. This allows a player to control two traditional hand-held video gaming controller functions by resting the sole of the shoe 50 on a firm surface and rocking their foot forward or backward. Further, a quad function rocker pedal mechanism may be incorporated into the gaming shoe 50, as shown in FIG. 5. This allows the player to rock their foot forward, backward and side to side to imitate the functions of a traditional joystick.

Figure 6:
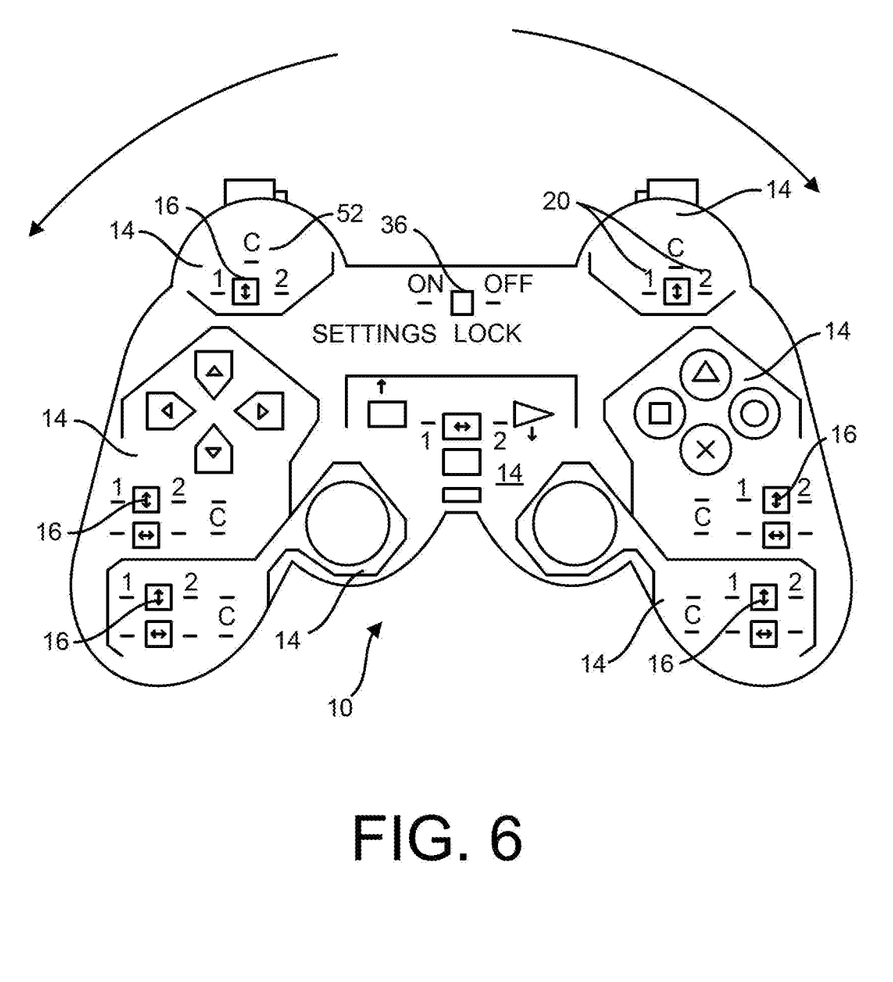
FIG. 6 illustrates the top view of an alternate embodiment of the programmable hand-held video gaming controller of the present disclosure.

In another embodiment, variations of the integrated foot pedal gaming controller platform 12, may be incorporated into the programmable hand-held video gaming controller itself. For example, in one embodiment; rather than having a rocker pedal mounted on a deck platform, a "dual function" rocker mechanism may be incorporated into the construction of a programmable hand-held video gaming controller 10, as shown in FIG. 6. This allows a player to control two traditional hand-held video gaming controller functions by "rotating" the programmable hand-held video gaming controller to the "left" or to the "right". Indicator light 52 as shown in FIG. 6 alerts the player that control function has been transferred to the dual function rocker mechanism in the programmable hand-held video gaming controller.

Integrated foot pedal gaming controller platform 12 may also include an adjustable hinged connecting frame 42 that supports the integrated foot-pedal gaming controller platform 12, adjusts for pitch, and is configured to fold for easy transportation.

In one embodiment, integrated foot pedal gaming controller platform 12 can be comprised of two separate panels (indicated by dashed lines 44) that can slide apart on rails thus extending the length of integrated foot pedal gaming controller platform 12 for two-player action. Alternately, integrated foot pedal gaming controller platform 12 can be comprised of only one panel with two pedals as indicated by the dashed lines 46. Handles 48 may be positioned atop integrated foot pedal gaming controller platform 12 or a single handle 48 may be positioned atop integrated foot, pedal, gaming controller 12 to allow for easy transportation.

Figure 3:
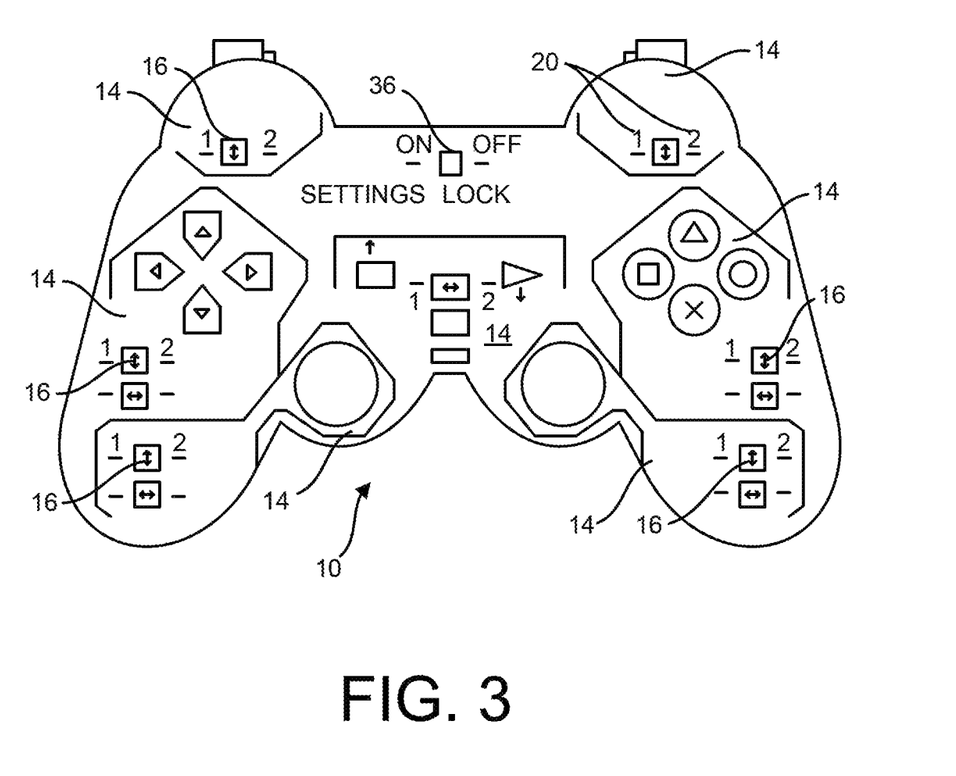
FIG. 3 illustrates atop view of an alternate embodiment of the programmable hand-held video gaming controller of the present disclosure.

FIG. 3 illustrates an exemplary layout of an alternate programmable hand-held video gaming controller 10 of the present disclosure. The game controller 10 illustrated in FIG. 3 is similar to the game controller 10 shown in FIG. 1 except that the game controller 10 in FIG. 3 is for use with a two-pedal integrated foot pedal gaming controller platform 14. A seen, indicator lights 20 can illuminate as either a "1" or a "2" to identify which foot pedal on integrated foot pedal gaming controller platform 14 has been transferred (or is sharing) control of that particular gaming function.

In one embodiment, a dual function rocker mechanism can be incorporated into the construction of the programmable hand-held video gaming controller itself; allowing a player to activate a function control transfer switch located on a game function activation area of the programmable hand-held video gaining controller; the activation of the function control transfer switch transferring control of the game function associated with the game function activation area to corresponding dual function rocker mechanism contained inside the programmable hand-held video gaming controller, allowing the game function to be activated by rotating the programmable hand-held video gaming controller to the "left" or the "right"; illumination of the function control transfer switch will alert the player that the dual function rocker mechanism in the programmable hand-held video game controller has been activated and indicator lights C 52, indicates which gaming functions on the hand-held video gaming controller has been transferred; and transferring control of the game function associated with the function control transfer switch to the dual function rocker mechanism contained within the programmable hand-held video gaming controller while maintaining control of the game function on the programmable hand-held video gaming controller, thereby allowing the game function to be shared between the programmable hand-held video gaming controller buttons or joysticks and by rotating the programmable hand-held video gaming controller to the "left" or to the "right".

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A gaming platform, comprising:
  a programmable hand-held video gaming controller comprising:
    at least one game function activation area, each of the at least one game function activation areas operating a game function, each of the at least one game function activation areas further comprising a function control transfer switch;
  an integrated foot-pedal gaming controller platform in electrical communication with the programmable hand-held video gaming controller, the integrated foot-pedal gaming controller platform comprising:
    at least one foot pedal configured to control at least one game function on the programmable hand-held video gaming controller when a corresponding function control transfer switch on the programmable hand-held video gaming controller is activated, wherein at least one pedal of the integrated foot pedal gaming controller platform is a dual function rocker pedal or quad function rocker pedal and includes a function inverter switch enabling a user to toggle between upright pedal function and inverted pedal function.

2. The gaming platform of claim 1, wherein each function control transfer switch is configured to transfer control of the game function to different foot pedals on the integrated foot pedal gaming controller platform upon successive activations of the function control transfer switch.

3. The gaming platform of claim 1, wherein the function control transfer switch is configured to transfer control of the game function associated with the function control transfer switch to the integrated foot pedal gaming controller platform and disable control of the game function on the programmable hand-held video gaming controller.

4. The gaming platform of claim 1, wherein each pedal on the integrated foot pedal gaming controller platform further includes an upright pedal function indicator to indicate that the pedal is set to an upright pedal function and an inverted pedal function indicator to indicate that the pedal is set to an inverted pedal function.

5. The gaming platform of claim 1, wherein the integrated foot pedal gaming platform is adaptable for use with multiple programmable hand-held video gaming controllers.

6. The gaming platform of claim 1, wherein the dual function rocker pedal is incorporated in a gaming shoe.

7. The gaming platform of claim 1, wherein the quad function rocker pedal is incorporated in a gaming shoe.

8. The gaming platform of claim 1, wherein a dual function rocker mechanism is incorporated in the programmable hand-held video gaming controller.

\* \* \* \* \*